Patented July 21, 1931

1,815,563

UNITED STATES PATENT OFFICE

LAWRENCE M. HENDERSON, OF NARBERTH, AND HENRY C. COWLES, JR., OF PHILADELPHIA, PENNSYLVANIA, ASSIGNORS TO THE ATLANTIC REFINING COMPANY, OF PHILADELPHIA, PENNSYLVANIA, A CORPORATION OF PENNSYLVANIA

PROCESS OF SWEETENING PETROLEUM DISTILLATES

No Drawing.   Application filed March 15, 1928.   Serial No. 262,042.

Our invention relates to improvements in refining hydrocarbon oils, and more particularly to the removal of certain objectionable characteristics from petroleum distillates, either primary or cracked.

Petroleum distillates, especially those from crude oils having high sulphur content, ordinarily contain organic compounds, probably to a large extent mercaptans, which impart a disagreeable odor and prevent the distillates from meeting certain standard specifications, such, for example, as the requirement that they shall be "sweet" to the "doctor test" described in Technical Paper No. 323-B of the Bureau of Mines.

In accordance with our invention petroleum distillates, especially those containing sulphur in the form of mercaptans, are improved as to odor and rendered "sweet" to the "doctor test", by subjecting them, either in batch operation or continuous process, to a suitable reagent, particularly a copper salt, in aqueous solution. Further in accordance with our invention the reagent is revivified or brought to or maintained in an active state while in contact or in treating relation with the distillate, with consequent economy in that with a certain amount of reagent practically unlimited amounts of distillate may be treated. Particularly the reactivation or maintenance of the salt solution in an active state is effected by the use of oxygen or oxygen-containing gas.

Another feature contemplated by our invention is that the aqueous solution of reagent may be rendered or maintained substantially neutral by addition thereto of a suitable compound, more particularly a buffer salt or a mixture of two or more of them. Further in accordance with our invention the reagent is of a character which effects treatment of the distillate without formation of a sludge, thereby dispensing with the problem of sludge disposal.

In the practice of a process in accordance with our invention, the oil or distillate having undesirable characteristics of the character above referred to, is treated by thoroughly intermixing or agitating therewith an aqueous solution of a copper salt, for example and preferably, cupric chloride, though it shall be understood that there may be utilized other soluble copper salts, including for example copper sulphate, particularly if they lend themselves to reactivation or maintenance in active condition by oxygen or oxygen-containing gas, such as air.

The aqueous solution of copper salt is preferably in a substantially neutral condition, as effected by addition thereto of any suitable compound, and preferably a buffer salt or salts, or a mixture of two or more of them, such as for example, sodium borate, sodium phosphate, or equivalent.

In batch operation, a quantity of oil or distillate is thoroughly intermixed or agitated with the aqueous solution of copper salt for a suitable period of time, whereupon the mixture is allowed to stand, forming an upper layer of treated oil or distillate, and an aqueous lower layer containing more or less exhausted reagent. The oil and aqueous layers may be separated from each other and the latter treated by blowing therethrough or agitating therewith oxygen, or an oxygen-containing gas, such as air, which effects revivification or reactivation of the reagent by restoring the copper salt to an active condition.

Or either in batch operation or a continuous process, while the aqueous solution of copper salt is in treating contact or relation with the oil or distillate, oxygen or oxygen-containing gas, such as air, may be simultaneously intermixed with, blown into or passed through the mixture of oil or distillate with aqueous solution of reagent immediately and continuously to restore or reactivate the copper salt.

By way of example, and without limitation of our invention thereto, a process in accordance with our invention may be practised as follows:

A cracked gasoline, sour in the sense that by the "doctor test" it is shown to contain undesirable organic compounds of the character above referred to, is vigorously agitated with an aqueous solution containing 20% of cupric chloride and 0.75% of borax or sodium tetraborate, in the proportion of 500 parts, by volume, of the gasoline to 200 parts of the aqueous salt solution. The agitation is prolonged for a suitable period, for example a minute or two, whereupon the mixture is allowed to stand to effect separation into upper and lower layers consisting respectively of gasoline and aqueous solution. Separation is effected by drawing off the treated gasoline which, by the "doctor test", is found to be "sweet". Through the aqueous salt solution constituting the aforesaid lower layer is passed air for approximately two minutes, effecting regeneration or reactivation of the reagent which is then used to treat in the same way a further batch of sour cracked gasoline. In this way a total of 7500 parts of sour cracked gasoline has been treated with 200 parts of the aqueous metal salt solution which latter was reactivated after the treatment of each batch of 500 parts of the gasoline. Each batch of treated gasoline exhibited a "sweet" reaction to the "doctor test", thereby establishing that the effectiveness or activity of the salt solution throughout the successive batch treatments was undiminished. After treatment of the last batch an analysis showed that the copper content of the aqueous solution was unchanged, establishing that there had been no loss of copper or its salt, and indicating that the aqueous solution of the reagent might have been utilized in the further treatment of oil or distillate having the aforesaid objectionable characteristics.

In the treatment of the oil or distillate by a reagent of the character above referred to, no sludge is formed, contrasting our process with certain prior processes, for example those utilizing sodium plumbite, lead acetate, or the like, wherein the formation of sludge is a decidedly objectionable feature. In prior processes of the aforesaid character there arises a comparatively large loss of the reagent in the sludge, while it is characteristic of our process that the loss of reagent, if any, is extremely small or inconsequential.

In the appended claims the term "sweetening" shall be construed as referring to rendering an oil "sweet" by the aforesaid "doctor test"; and the term "substantially free from other salts" shall be construed substantially to exclude salts, other than cupric chloride or equivalent copper salts, which shall not be present in excess of about 2 percent by weight of the solution.

What we claim is:

1. The process of repeatedly utilizing an aqueous solution of cupric chloride and a buffer for sweetening successive portions of a light petroleum distillate, which comprises treating a portion of the distillate with the solution, reactivating the solution by passing an oxygen-containing gas therethrough, and utilizing the regenerated solution for treatment of a second portion of the light petroleum distillate.

2. The process of repeatedly utilizing an aqueous solution of cupric chloride and sodium tetraborate for sweetening successive portions of light petroleum distillate, which comprises treating a portion of the distillate with the solution, reactivating the solution by passing an oxygen-containing gas therethrough, and utilizing the regenerated solution for treatment of a second portion of the light petroleum distillate.

3. A process of sweetening hydrocarbon oil, which comprises treating the oil with a buffer salt and a copper salt, the latter susceptible after reaction to reactivation by free oxygen, both salts in solution substantially free from other salts.

4. A process of sweetening hydrocarbon oil, which comprises treating the oil with a buffer salt and a copper salt, the latter susceptible after reaction to reactivation by free oxygen, both salts in solution substantially free from other salts, and simultaneously maintaining the solution active by intimate contact with a gas containing free oxygen.

5. A process of sweetening hydrocarbon oil, which comprises treating the oil with sodium tetraborate and a copper salt, the latter susceptible after reaction to reactivation by free oxygen, both salts in solution substantially free from other salts.

6. A process of sweetening hydrocarbon oil, which comprises treating the oil with sodium tetraborate and a copper salt, the latter susceptible after reaction to reactivation by free oxygen, both salts in solution substantially free from other salts, and simultaneously maintaining the solution active by intimate contact with a gas containing free oxygen.

7. The process of repeatedly utilizing to sweeten successive portions of a hydrocarbon oil sodium tetraborate and a copper salt, the latter susceptible after reaction to reactivation by free oxygen, both salts in solution substantially free from other salts, which comprises treating a portion of the oil with the solution, reactivating the solution by intimate contact with a gas containing free oxygen, and utilizing the reactivated solution for treatment of a second portion of the oil.

8. A process of sweetening hydrocarbon oil, which comprises treating the oil with a solution containing cupric chloride and a buffer salt, and substantially free from other salts, and simultaneously maintaining said solution active by intimate contact with a gas containing free oxygen.

9. A process of sweetening hydrocarbon oil, which comprises treating the oil with a solution containing cupric chloride and sodium tetraborate, and substantially free from other salts, and simultaneously maintaining said solution active by intimate contact with a gas containing free oxygen.

10. The process of repeatedly utilizing a solution containing cupric chloride and sodium tetraborate and substantially free from other salts for sweetening successive portions of a hydrocarbon oil, which comprises treating a portion of the oil with the solution, reactivating the solution by intimate contact with a gas containing free oxygen, and utilizing the reactivated solution for treatment of a second portion of the oil.

LAWRENCE M. HENDERSON.
HENRY C. COWLES, Jr.